Figure 1:
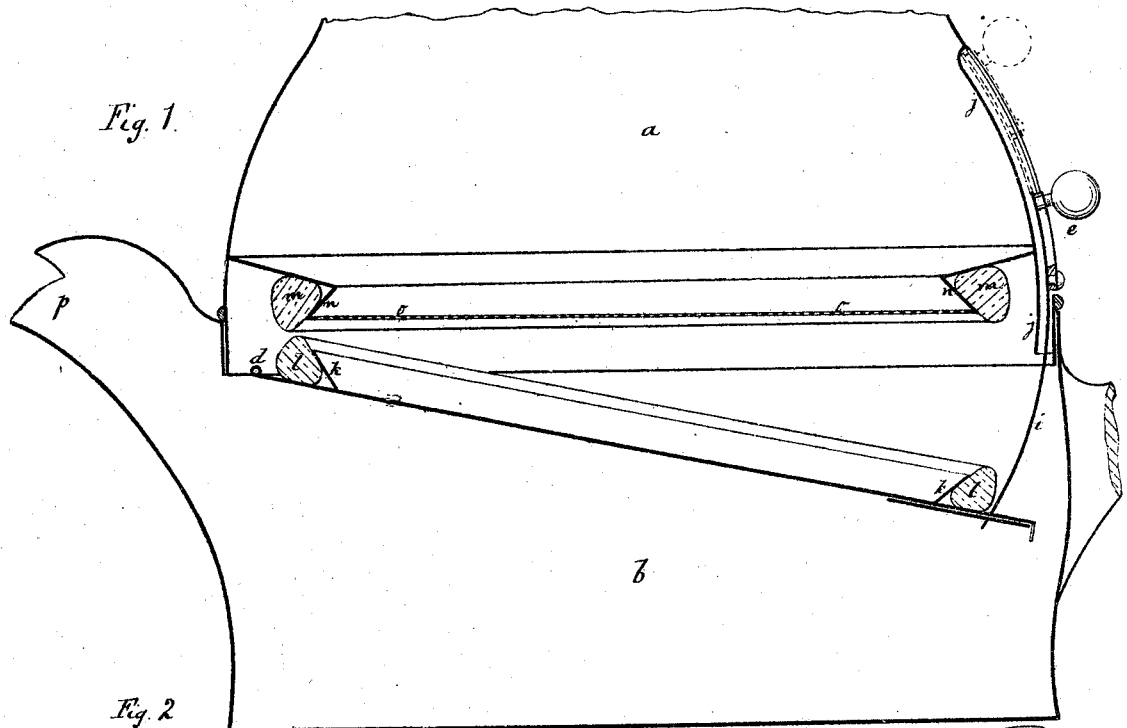

4 Sheets--Sheet 1.

W. N. HUTCHINSON.
Coffee Pot.

No. 124,579. Patented March 12, 1872.

W. N. HUTCHINSON.
Coffee Pot.
No. 124,579.   Patented March 12, 1872.
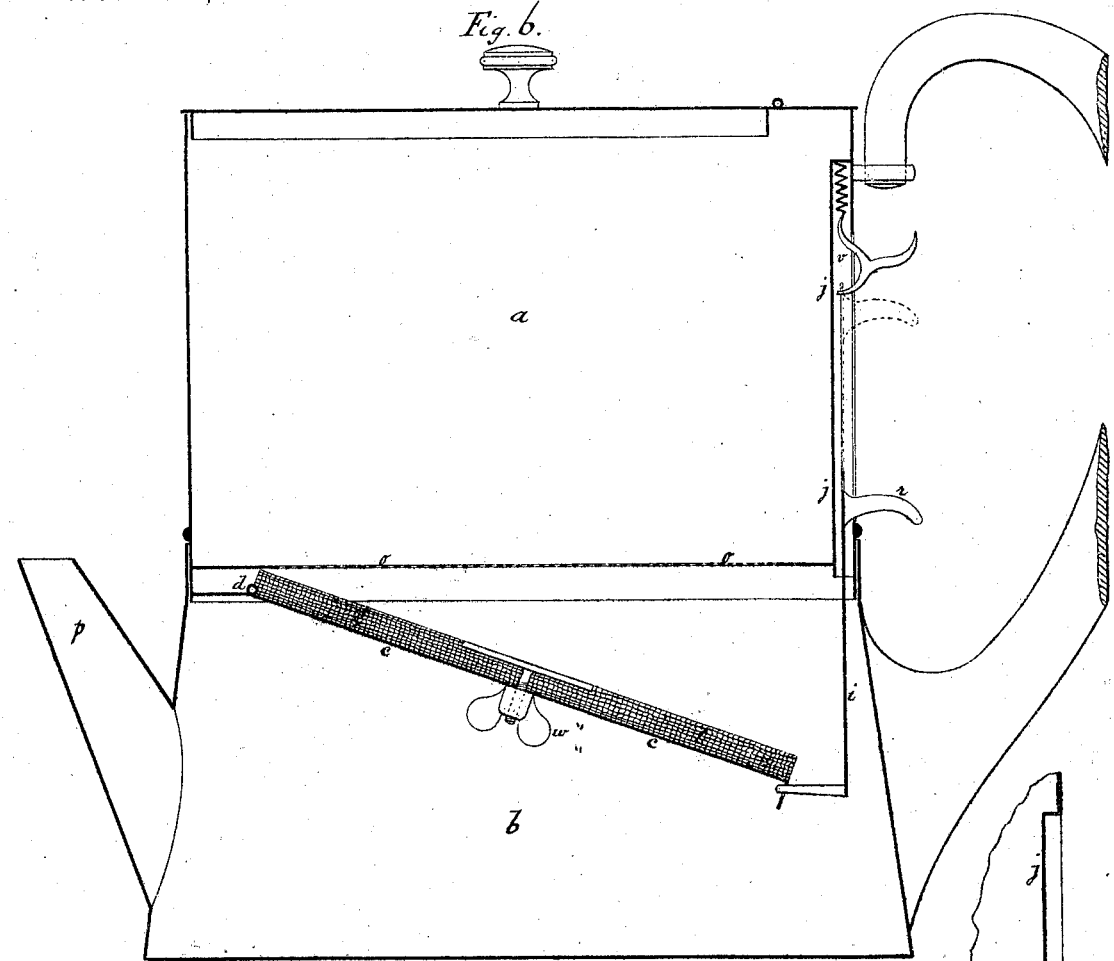
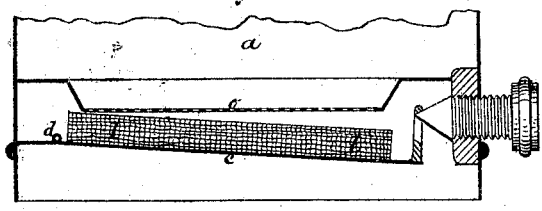
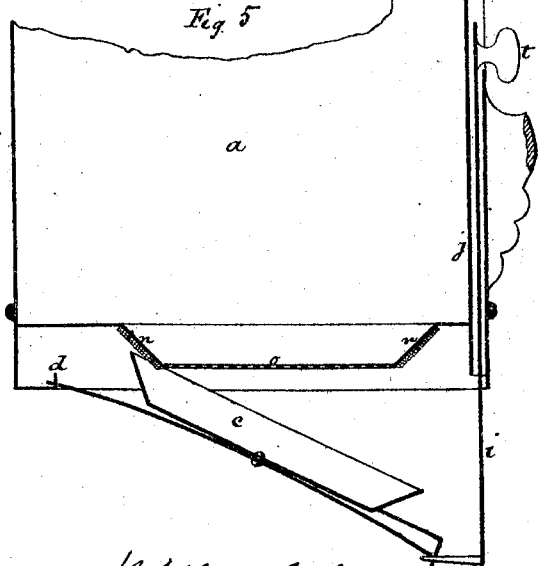
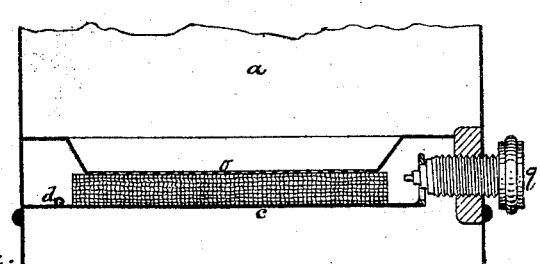

4 Sheets--Sheet 3.
W. N. HUTCHINSON.
Coffee Pot.
No. 124,579.
Patented March 12, 1872.
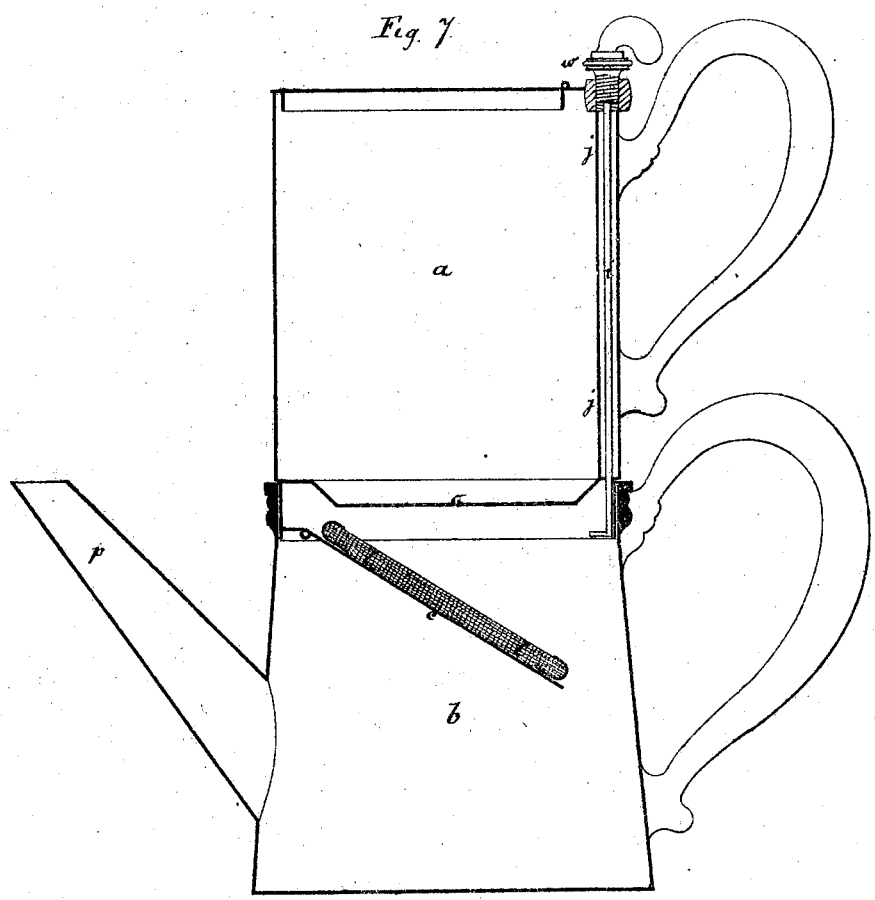
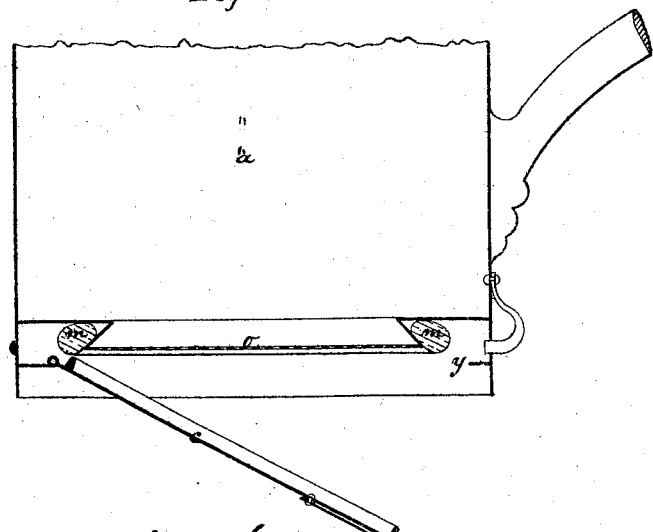

4 Sheets--Sheet 4.
W. N. HUTCHINSON.
Coffee Pot.
No. 124,579.  Patented March 12, 1872.
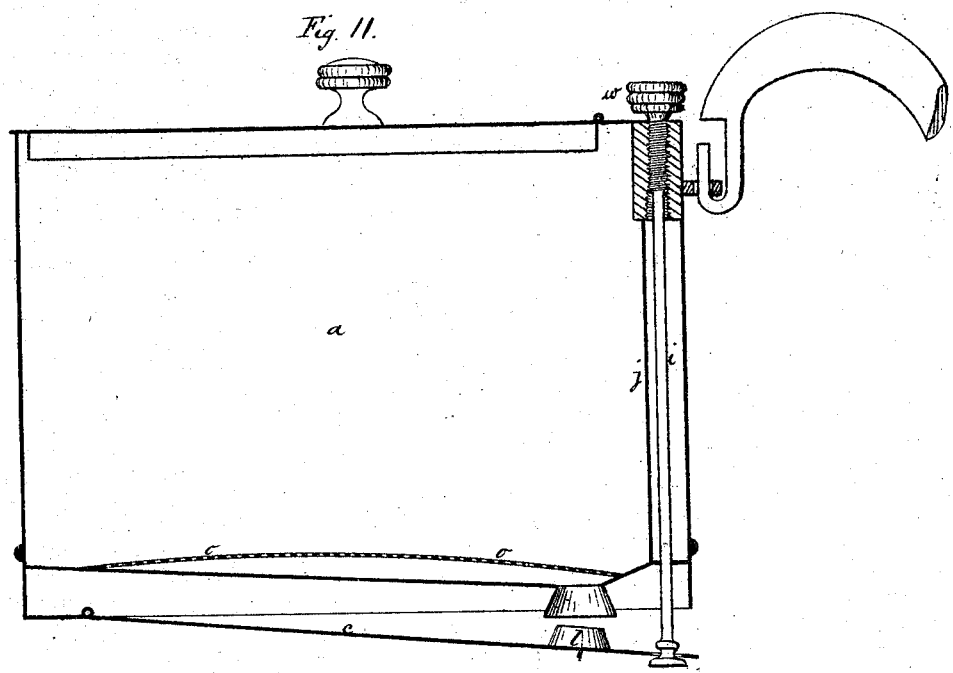

UNITED STATES PATENT OFFICE.

WILLIAM NELSON HUTCHINSON, OF WELLESBOURNE, BIDEFORD, ENGLAND.

IMPROVEMENT IN COFFEE-POTS.

Specification forming part of Letters Patent No. 124,579, dated March 12, 1872.

*To all whom it may concern:*

Be it known that I, WILLIAM NELSON HUTCHINSON, of Wellesbourne, Bideford, in the county of Devon, England, lieutenant-general in Her Majesty's army, have invented certain new and useful "improvements" in "apparatus" for obtaining infusions and decoctions "from coffee and other berries, grains, seeds, and leaves," which improvements I believe will be of great public utility; that I am the inventor thereof, and that the following is a full, true, and exact description thereof, reference being had to the drawing hereunto annexed—that is to say:

It is usual, when making infusions or decoctions from coffee and other berries, grains, seeds, and leaves, to pour the water or other liquid upon them in a close vessel, and after allowing them to stand for a short time to empty the whole out into another vessel having a strainer to separate the solid particles from the liquid; also, in making coffee, for which purpose my invention is more especially applicable, it is usual to pour the water upon the ground coffee in a vessel with a strainer or perforated bottom, through which the water passes into the under vessel. The immediate passage of the water from one vessel to the other prevents the flavor and aroma being extracted from the grounds to the fullest extent, and consequently the liquid extract is not so strong as it should be. Now, according to my invention, the water can be kept in contact with the grounds for any length of time, and then be allowed to flow through the strainer or perforated bottom to separate itself from them. This is accomplished by applying a cap or cover, which fits to and presses against the perforated bottom. The cap or cover is of plain metal, and, the more effectually to prevent leakage, there generally is India rubber, or felt, or other suitable substance between the perforated bottom and the cap. Without separating the two vessels, the cap or cover, or part of the cap or cover, is capable of being removed by hand, or in any other suitable manner, from its close connection with the perforated or other more open bottom, to permit of the liquid flowing through. The advantage of this is, that the whole flavor or aroma of the substance is extracted.

Figure 2:
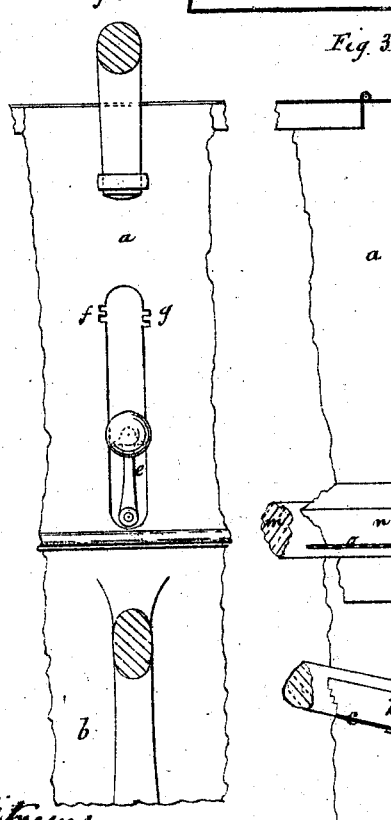

The manner of carrying my invention into effect is represented in the annexed drawing, in which Figure 1 shows a coffee-pot formed in two parts, $a$ $b$. The upper part, $a$, is provided with a flat ring to fit into the neck of the lower, $b$, in a water-tight or nearly water-tight manner. $c$ is the cap or cover, here represented as divided into two parts. The smaller is soldered to the lower edge of $a$, and forms a fulcrum, on which the larger part hinges at $d$, and opens or closes when the fastener $e$, released from any of the notches $f$ $g$, shown in Fig. 2, is lowered or raised. The fastener or catch $e$ is swiveled on a pin at the top of the catch-plate $i$, which pin acts as a guide to the slot formed at the back of the pot and under the handle, so as to be out of the way. The lower end of the catch-plate is so extended that, at its lower end, a slotted hole cut in it receives a broad strap attached to the back end of the cap $c$. This catch-plate travels in a chamber formed by a lining-piece, $j$, to prevent escape of liquid. The hinged part of the cap or cover $c$ has a conical ring or band, $k$, of great or little diameter, secured on its upper face, for an elastic or other ring, $l$, of soft material, to be stretched or passed over, to act as a cushion to bear against another elastic or soft cushion, $m$, stretched or passed over a reversed cone, ring, or band, $n$, of similar diameter, in the bottom of the upper part $a$, the meeting of which cushions forms a liquid-tight joint between the two parts $a$ $b$. The reversed cone $n$ has a perforated or gauze disk, $o$, which, in this arrangement, forms a bottom to the upper part of the pot, and serves to retain the solid particles of grounds or coffee, while it allows the extract to pass through into the lower part $b$, to be drawn off at pleasure through the spout $p$. The pin of the hinge of the cap or cover is made removable. Where a piece of circular wire (traveling in a circular hole at the foot of the plate) is substituted for the broad strap attached to the back end of the cap or cover, the arm which connects the button of the fastener $e$ with the pin could be, as also the pin, dispensed with. The button with its two teeth would be firmly attached to the upper part of the catch-plate. There are many ways in which the cap or cover and its accessories could be arranged in the upper part of the pot, and by way of example I have, in Figs. 3 to 11, represented several shapes, in order to render the invention of as clear a character as possible.

Figure 3:
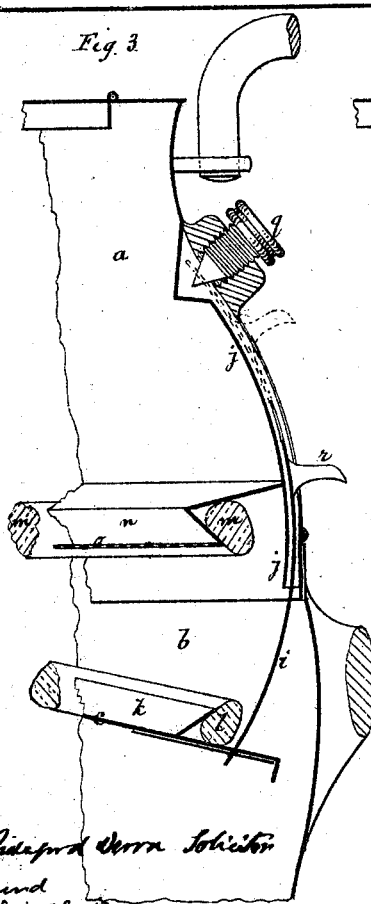
Figure 4:
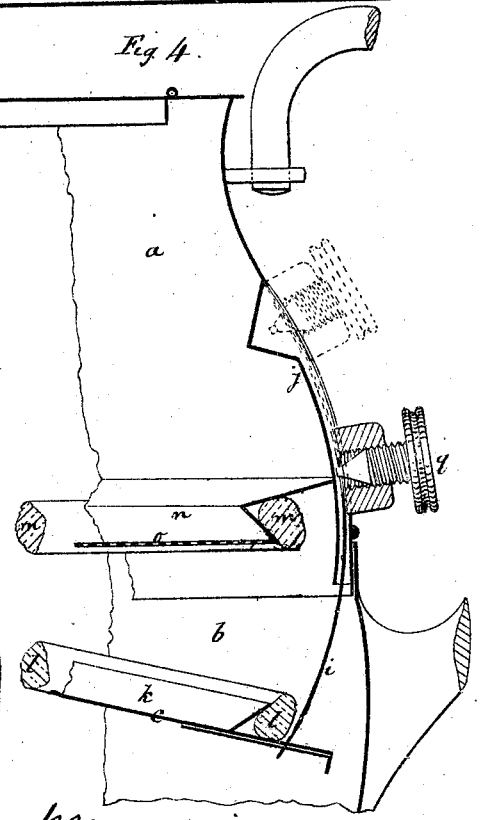

Fig. 3 shows a thumb-screw, $q$, in a shoulder or socket, soldered on the pot, the point of which screw is caused to enter a large aperture in the upper part of the catch-plate when the plate and the cap or cover are raised by the finger-loop r, so as to bring the cushion-rings into close contact. Fig. 4 shows an arrangement in which the thumb-screw q is secured to the top of the plate i, and slides up and down in the slot formed at the back of the pot, and the point of it may be made to travel in a groove in the chamber-lining j. By turning the thumb-screw when it is raised to the part shown by the dotted lines, the cushion-rings are squeezed into the closest contact. The screw acts well when the coned part is cut with a flat spiral thread. The aperture in the plate would then lie in a plane parallel to the general direction of the spiral threads. In each of the foregoing figures I have shown what is called a bellied pot; but the pot may be of any other shape, for my invention is applicable to all shapes and forms.

Fig. 5 is a view of the upper part of a "cafetiere." Here the cap or cover is secured to a piece or a strip of steel, which is loosely hinged at d on two pins, and instead of employing two cushions, as in the first-mentioned figures, I secure a strip of material (elastic or flexible) onto the cone n, which is to be pressed against by the cap or cover c when the button t is acted upon to shut off communication between the two parts a b of the pot. By careful workmanship the two cones, whether large or small, might fit so closely together as to render unnecessary the interposition of any elastic material. The axis of the hinge would lie in and at right angles to a line taken from the top of the perforated cone, and at right angles to its side. A stop on the broad slot in which the foot of the catch-plate travels, prevents its free play being interfered with by the pressure of the steel spring.

In Fig. 11 a small part only of the cap or cover works on a hinge, as represented. At its circumference it is fitted to and soldered against the edge of the perforated bottom. In the three figures the aperture in the cap or cover is closed water-tight, whenever required, by l, as shown. l is, as may be judged best, an elastic or ground stopper, or a valve, or possibly a swiveled valve. The end which rests on the circular foot given to the wire-catch i, represented in Fig. 11, has free play, the slot being open and oblong. In all three figures, i is round.

In Fig. 6 the cushion on the hinged cap or cover is of a flat character, to press direct upon or against the perforated or gauze disk or bottom o, and thus prevent the passage of the liquid until the catch is released. The cushion is held in position by a plate and tightening-screw, w, as represented, or by a surrounding concave metal band, as shown in Fig. 7. The catch may be caught by the spring-claw which is screwed in the chamber v, as represented.

Fig. 7 represents another modification of the catch mechanism. In this the catch is a circular wire. Its head (a lug-button) rests on the top of a thumb-screw, w, which, on being screwed, raises the whole of the catch, thereby compressing the pad or cushion liquid-tight against the perforated cone.

Figs. 8 and 9 are detached views of a cap or cover, with the thumb-screw q arranged below the strainer o, and in which the compression of the pad, &c., is effected by the conical shape of the screw-point, which, as it is being screwed in, lifts the cap gradually into closer contact with the strainer.

In Fig. 10 the cap or cover has a fixed ring or band stranding up upon it, to take against the cushion m when the cap or cover is lifted by hand a distance sufficient for the catch x to be passed over the flat projection y. The cap or cover falls by pressing the represented spring against the pin; or, without this spring and pin, the cap or cover could be made to fall by turning a, say, one-tenth inch within b, and thus bringing the represented large lower pin to act against a projection from the inside of b, near its handle. In the first case, the pin and the pin on which the catch pivots would lie, when the catch rested on the flat projection, much in the direction of the chord of the cap or cover, supposing it to be circular. In the second case, the large lower pin and the pin on which the catch pivots would lie, when the catch rested on the flat projection, in the direction of a radius.

I claim—

1. The employment of a liquid-tight cap or cover in a vessel in which infusions or decoctions are to be made from substances placed therein, which cap or cover is fitted to, or, when working on a hinge, can be pressed against, a perforated or gauze strainer, as shown and described.

2. I claim the employment of an elastic or other cushion, or pad, or ring, or band in connection with a hinged cap or cover, and the employment of an elastic cushion, pad, or valve in connection with an aperture in an unhinged cap or cover, in such vessels as are hereinbefore described and shown, when such cushion, pad, ring, or valve is used for the purposes set forth.

3. I claim the apparatus herein referred to, or equivalent, by which the hinged cap or cover can be drawn up and released, and the apparatus by which the aperture in the unhinged cap or cover can be closed and opened, as described and shown.

In witness whereof I, the said WILLIAM NELSON HUTCHINSON, have hereunto set my hand this 4th day of December, one thousand eight hundred and seventy-one.

W. N. HUTCHINSON,
*Lieut. General.*

Witnesses:
GEO. OLIVA PEARD,
*Bideford, Devon, Solicitor.*
JAMES S. B. BRAUND,
*Bideford, Devon, his clerk.*